(12) United States Patent
Zhu et al.

(10) Patent No.: US 10,919,262 B2
(45) Date of Patent: Feb. 16, 2021

(54) FIRE-RETARDANT NANOCELLULOSE AEROGELS, AND METHODS OF PREPARATION AND USES THEREOF

(71) Applicant: Northeastern University, Boston, MA (US)

(72) Inventors: Hongli Zhu, Arlington, MA (US); Lei Yang, Newton, MA (US)

(73) Assignee: Northeastern University, Boston, MA (US)

( * ) Notice: Subject to any disclaimer, the term of this patent is extended or adjusted under 35 U.S.C. 154(b) by 335 days.

(21) Appl. No.: 15/869,879

(22) Filed: Jan. 12, 2018

(65) Prior Publication Data

US 2018/0229471 A1    Aug. 16, 2018

Related U.S. Application Data

(60) Provisional application No. 62/445,470, filed on Jan. 12, 2017.

(51) Int. Cl.
| | |
|---|---|
| *B32B 5/32* | (2006.01) |
| *C09K 21/14* | (2006.01) |
| *C09K 21/02* | (2006.01) |
| *E04B 1/94* | (2006.01) |
| *B01J 13/00* | (2006.01) |
| *B32B 5/24* | (2006.01) |
| *E04B 1/76* | (2006.01) |
| *B63B 3/68* | (2006.01) |
| *B64D 45/00* | (2006.01) |

(52) U.S. Cl.
CPC ............. *B32B 5/32* (2013.01); *B01J 13/0091* (2013.01); *B32B 5/245* (2013.01); *C09K 21/02* (2013.01); *C09K 21/14* (2013.01); *E04B 1/76* (2013.01); *E04B 1/941* (2013.01); *B32B 2262/062* (2013.01); *B32B 2305/02* (2013.01); *B32B 2307/302* (2013.01); *B32B 2307/3065* (2013.01); *B32B 2307/72* (2013.01); *B63B 3/68* (2013.01); *B64D 2045/009* (2013.01)

(58) Field of Classification Search
CPC ........... B32B 5/32; B32B 5/245; C09K 21/02; C09K 21/14; B01J 13/0091; E04B 1/941
See application file for complete search history.

(56) References Cited

U.S. PATENT DOCUMENTS

| | | | |
|---|---|---|---|
| 5,569,513 A | 10/1996 | Fidler et al. | |
| 6,136,216 A | 10/2000 | Fidler et al. | |
| 10,022,888 B2 | 7/2018 | Chen | |
| 10,072,213 B2 | 9/2018 | Chen | |
| 10,343,131 B1 | 7/2019 | Hurwitz et al. | |
| 2012/0037838 A1* | 2/2012 | Bauer | E04B 1/88 252/62 |

(Continued)

OTHER PUBLICATIONS

Wicklein et al., "Thermally insulating and fire-retardant lightweight anisotropic foams based on nanocellulose and graphene oxide," Nature Nanotechnology, vol. 10, pp. 277-283 (Mar. 2015). (Year: 2015).*

(Continued)

*Primary Examiner* — Jeremy R Pierce
(74) *Attorney, Agent, or Firm* — Dana M. Gordon; Foley Hoag LLP

(57) ABSTRACT

Disclosed are multilayered aerogel nanocomposite materials, and methods of making and using them.

19 Claims, 6 Drawing Sheets

(56) References Cited

U.S. PATENT DOCUMENTS

| | | |
|---|---|---|
| 2013/0119294 A1 | 5/2013 | Christensen et al. |
| 2014/0287641 A1* | 9/2014 | Steiner, III ............ F41H 5/0442 442/223 |
| 2015/0219269 A1 | 8/2015 | Fleischer et al. |
| 2018/0111287 A1 | 4/2018 | Chen |
| 2018/0112134 A1 | 4/2018 | Chen |
| 2018/0229471 A1 | 8/2018 | Zhu et al. |
| 2018/0354849 A1 | 12/2018 | Milow et al. |
| 2019/0374921 A1 | 12/2019 | Mihalcik et al. |

OTHER PUBLICATIONS

Wang et al., "Anomalous nano-barrier effects of ultrathin molybdenum disulfide nanosheets for improving the flame retardance of polymer nanoconnposites," J. Mater. Chem. A, 2015, 3, 14307-14317. (Year: 2015).*

Lavoine et al., "Nanocellulose-based foams and aerogels: processing, properties, and applications," J. Mater. Chem. A, 2017, 5, 16105-1611. (Year: 2017).*

Huang et al., "Metallic 1T phase MoS2 nanosheets for high-performance thermoelectric energy harvesting," Nano Energy 26, pp. 172-179 (2016). (Year: 2016).*

* cited by examiner

US 10,919,262 B2

FIRE-RETARDANT NANOCELLULOSE AEROGELS, AND METHODS OF PREPARATION AND USES THEREOF

RELATED APPLICATION

This application claims the benefit of priority to U.S. Provisional Patent Application Ser. No. 62/445,470, filed Jan. 12, 2017.

BACKGROUND

Fire retardant, lightweight, and thermally insulation materials made from Earth-abundant and sustainable resources are highly desirable in energy efficient buildings and safe, fuel-efficient forms of transportation. Most current forms of building insulation are made from flammable organic and petroleum derived polymers, such as polystyrene, urethane, polyethylene, chitosan, and cellulose. These polymers often are manufactured with flame retardant additives, such as halogens, phosphorous, metallic oxide, graphene oxide, and the like, to decrease their flammability. During a fire these additives create toxic byproducts, such as halogenated hydrogen and phosphorous oxide, which are harmful to both humans and the environment. Accordingly, there remains a need in the art for fire retardant, lightweight, and thermal insulation materials made from abundant and sustainable resources.

SUMMARY

Provided herein are aerogels comprising a plurality of layers, wherein the plurality of layers include at least one inner layer and an outer layer, and all of the layers are bonded together to form a single, substantially fire resistant structure. In some embodiments, each inner layer forms a core that structurally supports the outer layer. In certain embodiments, at least one inner layer comprises cellulose fibers and the outer layer comprises a molybdenum disulfide ($MoS_2$).

Also provided herein are methods of preparing aerogels comprising a plurality of layers comprising freeze-drying a mixture of cellulose fibers and $MoS_2$. In some embodiments, the method further comprises immersing the mixture of cellulose nanofibers and $MoS_2$ in a cryogenic fluid (e.g., liquid nitrogen) prior to freeze-drying.

Also provided herein are methods of fire protections comprising providing a fire zone with one or more aerogels comprising a plurality of layers. In some embodiments, the fire zone is a vehicle (e.g., a flight vehicle or watercraft). In other embodiments, the fire zone is in a construction zone (e.g., for use as building insulation or on an oil platform (e.g., an offshore platform)).

DETAILED DESCRIPTION

Figure 1:
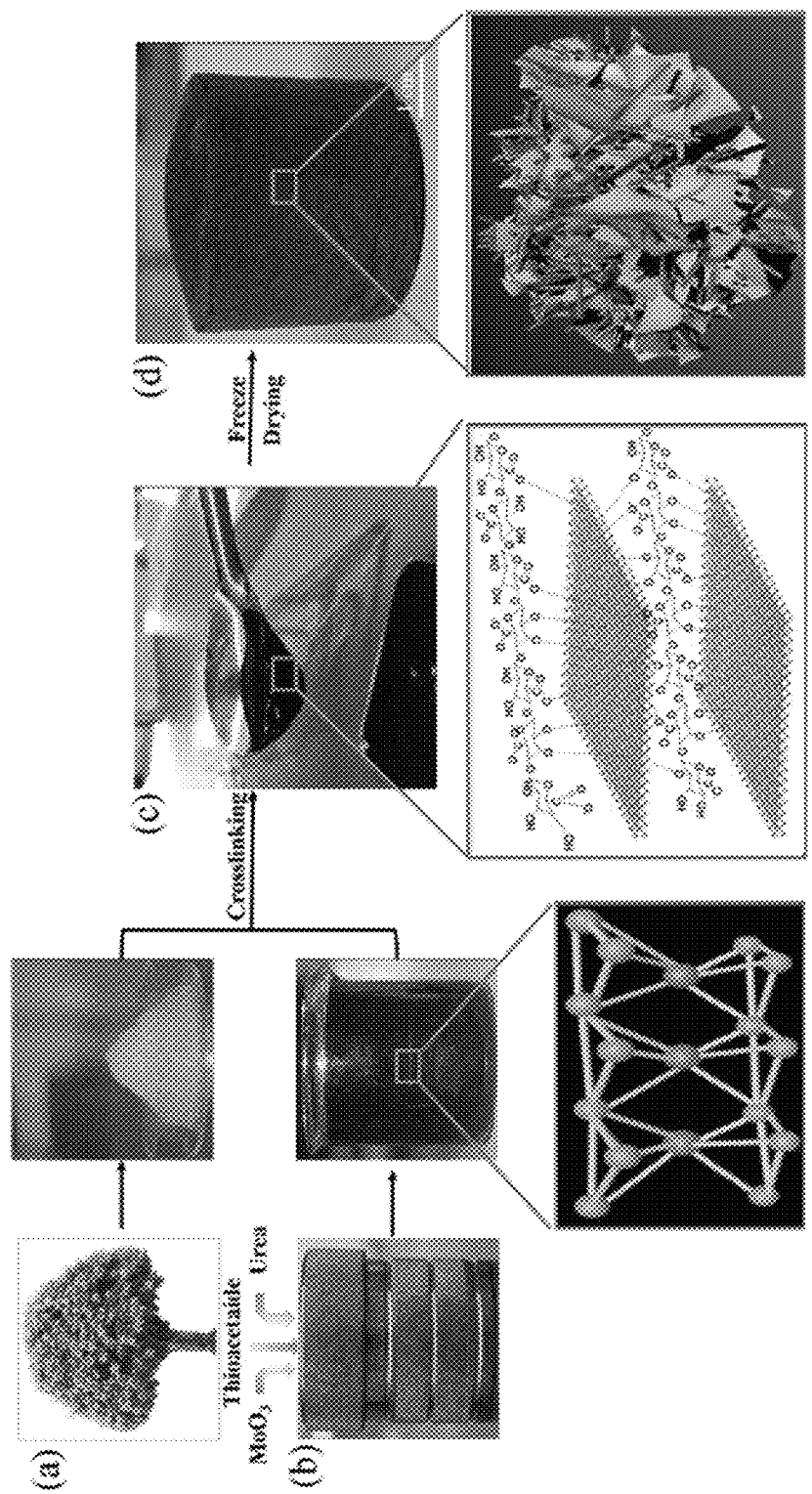
FIG. 1 is a series of images showing an exemplary method for preparing a CNF/$MoS_2$ nanocomposite aerogel. Image A is a cartoon depicting cellulose nanofiber disintegrated from hierarchical wood tracheid with chemical modification and mechanical homogenization. Image B shows the 1T metallic phase synthesis of $MoS_2$ using a hydrothermal process; the atomic crystalline structure of metallic phase $MoS_2$ is shown in the outset. Image C depicts gelation of CNF/$MoS_2$ aerogel by the crosslinking between $Mo^{4+}$ and —COOH and —OH groups in cellulose chains. Image D shows preparation of the CNF/$MoS_2$ aerogel by freeze drying after liquid nitrogen frozen; a schematic of CNF/$MoS_2$ aerogel is shown in the outset.

The above and other features of the invention, including various details of construction and combinations of parts, and other advantages, will now be more particularly described, and with reference to the accompanying drawings and claims.

The invention generally relates to a multilayered aerogel nanocomposite materials, methods of making said materials, and methods of using them.

Aerogels are low-density porous solids that have a large intraparticle pore volume and typically are produced by removing pore liquid from a wet gel. Products referred to as "xerogels" may be obtained from wet gels from which the liquid has been removed. The term xerogel often designates a dry gel compressed by capillary forces during drying, characterized by permanent changes, and collapse of the solid network. The term "aerogel" is used herein in a general sense, referring to both "aerogels" and "xerogels."

The aerogels disclosed herein comprise a plurality of layers, wherein the plurality of layers include at least one inner layer and an outer layer, and all of the layers (e.g., adjacent layers) are bonded together to form a single, substantially fire resistant structure. In some embodiments, each inner layer forms a core that structurally supports the outer layer. In certain embodiments, at least one inner layer comprises cellulose fibers, in particular cellulose nanofibers, and the outer layer comprises molybdenum disulfide ($MoS_2$).

Cellulose fibers are fibers made with ethers or esters of cellulose, which can be obtained from the bark, wood or leaves of plants, or from a plant-based material. The major constituents of natural cellulose fibers (lignocelluloses) are cellulose, hemicellulose, lignin, pectin, and ash. The percentage of each component varies for each different type of fiber; however, they are typically present in about 30 to about 80% cellulose, and about 1 to about 20% lignins. The amounts of these components directly affect the properties of the fiber, since the hemicellulose is responsible for moisture absorption, and bio- and thermal degradation, whereas lignin ensures thermal stability but is responsible for the UV degradation. The chemical composition of common natural fibers are shown in Table A, but can change if the fibers are a bast fiber (obtained from the bark), a core fiber (obtained from the wood), or a leaf fiber (obtained from the leaves).

TABLE A

Exemplary chemical composition of natural cellulose fibers.

| Type of fiber | | Cellulose (%) | Lignin (%) | Hemicellulose (%) | Pectin (%) | Ash (%) |
|---|---|---|---|---|---|---|
| Bast fiber | Fiber flax | 71 | 2.2 | 18.6-20.6 | 2.3 | — |
| | Seed flax | 43-47 | 21-23 | 24-26 | — | 5 |
| | Kenaf | 31-57 | 15-19 | 21.5-23 | — | 2-5 |
| | Jute | 45-71.5 | 12-26 | 13.6-21 | 0.2 | 0.5-2 |
| | Hemp | 57-77 | 3.7-13 | 14-22.4 | 0.9 | 0.8 |
| | Ramie | 68.6-91 | 0.6-0.7 | 5-16.7 | 1.9 | — |
| Core fiber | Kenaf | 37-49 | 15-21 | 18-24 | — | 2-4 |
| | Jute | 41-48 | 21-24 | 18-22 | — | 0.8 |
| Leaf fiber | Abaca | 56-63 | 7-9 | 15-17 | — | 3 |
| | Sisal | 47-78 | 7-11 | 10-24 | 10 | 0.6-1 |
| | Henequen | 77.6 | 13.1 | 4-8 | — | — |

In certain embodiments, the cellulose fibers are cellulose nanofibers (CNFs). CNFs are a material composed of nano-sized cellulose fibers with a high aspect ratio (length to width ratio). Typical fiber widths are about five to about 20 nanometers, with a wide range of lengths, but typically several micrometers. CNFs are pseudo-plastic and exhibits thixotropy, the property of certain gels or fluids that are thick (viscous) under normal conditions, but become less viscous when shaken or agitated. When the shearing forces are removed the gel regains much of its original state. The fibrils are isolated from any cellulose-containing source including wood-based fibers (pulp fibers) through high-pressure, high temperature, and high velocity impact homogenization, grinding or microfluidization. In certain embodiments, the CNFs are obtained from softwood pulp.

$MoS_2$ has a relatively low thermal conductivity and good fire retardant characteristics. In particular, the nanobarrier effect of $MoS_2$ nanosheets may suppress permeation of external heat and oxygen, inhibit the release of volatile toxic substances, and the Mo atom accelerates the formation of a charred layer from the polymer matrix, thus improving the flame retardance of the polymer composite. There are two kinds of $MoS_2$: semiconductor 2H phase $MoS_2$, and metallic 1T phase $MoS_2$. Herein, metallic $MoS_2$ was prepared using a hydrothermal method. The stability of the $MoS_2$ in water creates a challenge since the relatively hydrophobic surface of $MoS_2$ induces aggregation. In a composite material, it is difficult to mix uniformly semiconducting $MoS_2$ with the other polymer due to the high repulsive force created by the hydrophobic properties of $MoS_2$ and the hydrophilic nature of most polymers in aqueous solutions. Metallic $MoS_2$ is more hydrophilic due to its metallic trigonal structure, and therefore is better able to make a substantially uniform mixture with nanocellulose.

The aerogels of the invention typically have low bulk densities of about 0.01 $g/cm^3$ or less. For example, in some embodiments, the bulk density of the aerogels of the invention is from about 0.001 $g/cm^3$ to about 0.01 $g/cm^3$, from about 0.002 $g/cm^3$ to about 0.01 $g/cm^3$, from about 0.003 $g/cm^3$ to about 0.01 $g/cm^3$, from about 0.004 $g/cm^3$ to about 0.01 $g/cm^3$, from about 0.001 $g/cm^3$ to about 0.009 $g/cm^3$, from about 0.001 $g/cm^3$ to about 0.008 $g/cm^3$, from about 0.001 $g/cm^3$ to about 0.007 $g/cm^3$, 0.001 $g/cm^3$ to about 0.006 $g/cm^3$, or from about 0.001 $g/cm^3$ to about 0.005 $g/cm^3$. In certain embodiments, the bulk density of the aerogels of the invention is from about 0.003 to 0.006 $g/cm^3$. In other embodiments, the bulk density of the aerogels of the invention is about 0.0031 $g/cm^3$, about 0.0033 $g/cm^3$, about 0.0035 $g/cm^3$, about 0.0037 $g/cm^3$, about 0.0039 $g/cm^3$, about 0.0041 $g/cm^3$, about 0.0043 $g/cm^3$, about 0.0045 $g/cm^3$, about 0.0047 $g/cm^3$, about 0.0049 $g/cm^3$, about 0.0051 $g/cm^3$, about 0.0053 $g/cm^3$, about 0.0055 $g/cm^3$, about 0.0057 $g/cm^3$, or about 0.0059 $g/cm^3$.

The aerogels of the invention may also have a high porosity of about 90% or greater. In some embodiments, the porosity of the aerogels is about 90% to about 99%, about 91% to about 99%, about 92% to about 99%, about 93% to about 99%, about 94% to about 99%, about 95% to about 99%, from about 96% to about 99%, about 97% to about 99%, about 91% to about 98%, about 92% to about 98%, about 93% to about 98%, about 94% to about 98%, about 95% to about 98%, about 96% to about 98%, or about 97% to about 98%. In certain embodiments, the aerogels have a porosity from about 95% to about 99%. In other embodiments, the aerogels have a porosity of about 95%, about 96%, about 97%, about 98%, or about 99%.

The aerogels of the invention may also have an irregular pore distribution comprising micropores (i.e. from about 0 nm to about 2 nm in size) and mesopores (i.e., from about 2 nm to about 50 nm in size). In certain embodiments, the pore diameter is distributed at the range of about 30 nm to about 70 nm The aerogels may also have limited oxygen index of about 40% or less. For example in some embodiments, the oxygen index of the aerogels is from about 30% to about 40%, from about 31% to about 40%, from about 32% to about 40%, from about 33% to about 40%, from about 34% to about 40%, from about 34% to about 39/%, from about 34% to about 38%, from about 34% to about 37%, from about 34% to about 36%, from about 34% to about 35%. In certain embodiments, the oxygen index of the aerogels is from about 33% to about 36%. In other embodiments, the oxygen index of the aerogels of the invention is about 33.1%, about 33.3%, about 33.5%, about 33.7%, about 33.9%, about 34.1%, about 34.3%, about 34.5%, about 34.7%, about 34.9%, about 35.1%, about 35.3%, about 35.5%, about 35.7%, or about 35.9%.

The aerogels of the invention may also have a low thermal conductivity from about 20 mW/m·K to about 40 mW/m·K. For example, in some embodiments, the thermal conductivity of the aerogels is from about 20 mW/m·K to about 40 mW/m·K, about 21 mW/m·K to about 40 mW/m·K, about 22 mW/m·K to about 40 mW/m·K, about 23 mW/m·K to about 40 mW/m·K, about 24 mW/m·K to about 40 mW/m·K, about 25 mW/m·K to about 40 mW/m·K, about 26 mW/m·K to about 40 mW/m·K, about 27 mW/m·K to about 40 mW/m·K, about 27 mW/m·K to about 39 mW/m·K, about 27 mW/m·K to about 38 mW/m·K, about 27 mW/m·K to about 37 mW/m·K, about 27 mW/m·K to about 36 mW/m·K, about 27 mW/m·K to about 34 mW/m·K, about 27 mW/m·K to about 33 mW/m·K, about 27 mW/m·K to about 32 mW/m·K, about 27 mW/m·K to about 31 mW/m·K, about 27 mW/m·K to about 30 mW/m·K, about 27 mW/m·K to about 29 mW/m·K, or about 27 mW/m·K to about 28 mW/m·K. In certain embodiments, the thermal conductivity of the aerogels is from about 26 mW/m·K to about 29 mW/m·K. In other embodiments, the thermal conductivity of the aerogels is about 26 mW/m·K, 27 mW/m·K, 28 mW/m·K, or about 29 mW/m·K.

In some embodiments, the aerogels of the invention are substantially fire retardant or fire resistant. As used herein, the term "fire retardant" means that the aerogel is able to slow or stop the spread of fire or reduce its intensity. As used herein, the term "fire resistant" means that the aerogel is capable of resisting burning, and withstanding the heat of a fire.

In some embodiments, the aerogels of the invention are substantially smoke free and/or fire free. As used herein, the terms "smoke free" and "fire free" mean that the aerogel retards or prevents smoke and fire, respectively.

In some embodiments, the aerogels disclosed herein further comprise a hydrophobizing agent, e.g., one or more silylating agents, one or more fluorine-containing compounds such as fluorine-containing alkoxysilanes or alkoxysiloxanes, e.g., trifluoropropyltrimethoxysilane (TFPT-MOS), and/or one or more of other hydrophobizing compounds known in the art. Hydrophobizing agents can be used during the formation of aerogels and/or in subsequent processing steps, e.g., surface treatment.

In some examples, the aerogel is treated with a surface active agent, also referred to herein as a surfactant, dispersant, or wetting agent.

The surfactant may be selected from ionic (anionic and cationic) surfactants, amphoteric surfactants, nonionic surfactants, high molecular surfactants, and high molecular compounds, for example. Anionic surfactants can include, for example, alkyl sulfates and higher alkyl ether sulfates, more specifically, ammonium lauryl sulfate, and sodium polyoxyethylene lauryl sulfate.

Cationic surfactants include, for instance, aliphatic ammonium salts and amine salts, more specifically, alkyl trimethylammonium, and polyoxyethylene alkyl amine.

Amphoteric surfactants may be of betain type, such as alkyl dimethyl betain, or of oxido type, such as alkyl dimethyl amine oxido.

Nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others.

Generally, any surfactant that is compatible with the aerogel may be used. Specific examples of surfactants that can be employed include but are not limited to Pluronic P84, PE6100, PE6800, L121, Emulan EL, Lutensol FSA1O, Lutensol XP89 all from BASF, MP5490 from Michelmann, AEROSOL OT (sodium di-2-ethylhexylsulfosuccinite), BARLOX 12i (a branched alkyldimethylamine oxide), LAS (linear alkylbenzene sulfonates) and TRITON 100 (octylphenoxypolyethoxy(9-10)ethanol), TWEEN surfactants like TWEEN 100 surfactant, and BASF pluronic surfactants and others. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof.

Increasing the amount of surfactant tends to increase the depth to which the aqueous phase can penetrate and thus the thickness of the hydrophilic coating surrounding the hydrophobic aerogel core.

The aerogels disclosed herein may also include one or more additives, such as fibers, opacifiers, color pigments, dyes, and mixtures thereof. Non-limiting examples of opacifiers include carbon black, titanium dioxide, zirconium silicate, and mixtures thereof. Additives can be provided in any suitable amounts, e.g., depending on desired properties and/or specific application.

Methods of Preparation

The aerogels of the invention may be prepared by freeze-drying of a mixture of cellulose nanofibers and $MoS_2$.

Some embodiments of the disclosed methods utilize oxidized cellulose nanofibers. In some embodiments, the oxidized cellulose nanofibers are prepared by oxoammonium-catalyzed oxidation of softwood pulp, whereby the oxoammonium-catalyzed oxidation comprises reacting softwood pulp and an oxidizing agent. Exemplary oxidizing agents include, but are not limited to, sodium hypochlorite, 2,2,6,6-tetramethylpiperidine-1-oxyl (TEMPO) or a derivative thereof, potassium permanganate, chromium trioxide, pyridinium chlorochromate in dimethylformamide, ruthenium tetroxide, and platinum in an oxygen atmosphere. In certain embodiments, the oxidizing agent is sodium hypochlorite or 2,2,6,6-tetramethylpiperidine-1-oxyl (TEMPO) or a derivative thereof.

In some embodiments, the disclosed methods utilize metallic $MoS_2$. In some embodiments, the metallic $MoS_2$ is prepared by reacting molybdenum trioxide and urea. Exemplary conditions for this reaction involve reacting molybdenum trioxide and urea at 200° C. for about 18 hours.

In some embodiments, the disclosed methods further comprise a step of immersing the mixture of cellulose nanofibers and $MoS_2$ in a cryogenic fluid prior to freeze-drying the mixture. A cryogenic fluid typically is a fluid having has a boiling point of −150° C. and/or is a liquefied inert gas (e.g., nitrogen, helium, argon, or krypton). In certain embodiments, the cryogenic fluid is liquid nitrogen.

In some embodiments, the disclosed methods further comprise crosslinking the metallic $MoS_2$ and the cellulose nanofibers. In some embodiments, the crosslinked metallic $MoS_2$ and cellulose nanofibers form metal-carboxylate complexes.

In some embodiments, the disclosed methods further comprise suspending the mixture of cellulose nanofibers and metallic $MoS_2$ in deionized water prior to immersing the mixture in the cryogenic fluid. In some embodiments, the mixture of cellulose nanofibers and metallic $MoS_2$ is suspended in deionized water using sonication.

Methods of Use

The aerogels of the invention may be used to provide a fire zone with fire protection.

In some embodiments, the fire zone may be in a vehicle. Exemplary vehicles include, but are not limited to, flight vehicles (e.g., an aircraft, such as an airplane, a helicopter, a drone, or a spacecraft; a watercraft; a combination watercraft/aircraft, such as a hydroplane). In other embodiments, the fire zone is in a construction zone, such as a building. In some such embodiments, the aerogels of the inventions may be for use as insulation in the building. In yet other embodiments, the construction zone is an oil platform or offshore platform.

EXEMPLIFICATION

Smoke and Flame Free Retardant Nanocellulose Aerogel via Nanowraping with 2D $MoS_2$ Aerogels with cellulose nanofiber were prepared as internal skeleton and ultrathin molybdenum disulfide ($MoS_2$) nanosheets as external fire retardant layer. The prepared aerogel exhibited 97.36% porosity and 0.00473 g/cm³ density, which was attributed to the chemical crosslinking of the '$Mo^{4+}$', in the $MoS_2$ nanosheet with carboxyl (—COOH) and hydroxyl (—OH) groups in the cellulose nanofiber. This lightweight aerogel showed good mechanical stiffness in the vertical and horizontal directions. The aerogel showed excellent fire-resistant performance. The thermal conductivity (characterized by hot disk TPS 3500 instrument) was 28.09 $mWm^{-1}K^{-1}$. The limited oxygen index (tested by the ASTM 2863 standard method test) was 34.7%. The total heat release of $CNF/MoS_2$ (characterized by cone calorimetry) utilizing the oxygen consumption principle is 0.4 $MJ/m^2$. A vertical burning test showed that the aerogel had excellent fire resistance and was able to self-extinguish quickly. The Raman spectrum of the aerogel confirmed that the $MoS_2$ remained intact after 30 seconds of burning in a 1300° C. butane flame.

Materials and Methods $MoS_2$ Preparation: 1.2 mg/mL of molybdenum trioxide (Sigma-Aldrich, USA), 1.4 mg/mL of thioacetamide (Sigma-Aldrich, USA) and 10 mg/mL of urea (Fisher Scientific, USA) were mixed with deionized water using a magnetic stirrer. Then the mixture solution was poured into the autoclave (Parr Instrument Cop. USA), then reacted at 200° C. for 18 h. The preparation of 2D nanolayered $MoS_2$ was washed repeatedly with ethanol and DI water individually and sonicated in an ultrasonic generator (Boston LabCo, USA) with an amplitude of 20% for 10 min.

Cellulose Nanofiber Fabrication: The cellulose nanofibers (CNF) were prepared from softwood pulp, 2 g of softwood pulp was added in 100 mL deionized water containing 0.032 g of TEMPO (Sigma-Aldrich, USA), 0.2 g of NaBr (Sigma-aldrich, USA) and 6 mL of 12.5% NaClO solution (Sigma-Aldrich, USA). The 0.5 mol/L NaOH was added to keep pH at 10.0 at ambient temperature. After 2 h, the pH of the resulting mixture showed no further change, so the reaction mixture was stopped and kept at room temperature overnight. The oxidized cellulose fibers were sufficiently washed, then the solid portion was sonicated in ultrasonic generator with an amplitude of 40% for 60 min.

Aerogel Preparation: 5 mg/mL of oxidized cellulose nanofibers were completely suspended in DI water and mixed with 10.95 wt % of 2D nanolayered $MoS_2$ using an ultrasonic generator. The $CNF/MoS_2$ mixture was degassed under vacuum condition, then the mixture was slowly poured into the cylindrical Teflon pattern and quickly frozen in a liquid nitrogen bath. It was then dried to the aerogel in a freeze dryer (Labconco, USA).

Viscosity Test: The solution viscosity of $MoS_2$ (0.615 g/L), CNF (5 g/L) and $CNF/MoS_2$ mixture (5 g/L CNF and 0.615 g/L $MoS_2$) was measured by a Discovery HR-2 Rheometer (TA instrument, USA) at 25° C. The samples were measured at shear rates from 0.01 $s^{-1}$ to 100 $s^{-1}$.

Transmission Electron Microscopy Observations: TEM imaging was collected on a FEI Tecnai G2 F20 S-Twin microscope (FEI Company, USA) with the instrument voltage set to 100 kV. The sample was sonicated, diluted and centrifuged, then 25 μL of supernatant was dropped and dried onto holey carbon grids.

Scanning Electron Microscopy Observations: Morphology of the aerogel was measured using an ultra-high resolution scanning electron microscope (Hitachi S4800, USA). The aerogel samples were obtained in the radial and axial directions. Then the samples were coated with 5 nm platinum and measured under ultra-high resolution mode with 3 kV accelerating voltage.

Specific Surface Area and Microstructural Property Test: The specific surface area, pore size distribution and pore volume of CNF and $CNF/MoS_2$ aerogel were measured by the adsorption and desorption of $N_2$ at −196° C. using the NOVA surface area measurement system (Quantachrome instruments, USA). The sample was dried under vacuum at 60° C. for 12 h. The specific surface area was determined using the Brunauer-Emmett-Teller method, the pore size distribution and pore volume was calculated using the Barrett-Joyner-Halenda (BJH) method, respectively. The apparent density of CNF and $CNF/MoS_2$ aerogel was calculated by the weight and volume of the sample. The porosity of CNF and $CNF/MoS_2$ aerogel was obtained using Equation (1):

$$\text{Porosity} = 1 - \frac{\rho_{app}}{\rho_{sc}} \times 100 \quad (1)$$

Where $\rho_{app}$ is the apparent density, $\rho_{sc}$ is the skeletal density, which is calculated from a weighted average of the densities of the CNF and $MoS_2$. The skeletal densities of the pure CNF and $MoS_2$ is 1460 kg/m³ and 5060 kg/m³, respectively.

X-ray Tomography Observations: Cylindrical samples (10×10 mm) were prepared for the X-ray tomography. The sample was loaded and tested in a Skyscan 1172 μCT, the X-ray sources were set at 40 KV, 249 μA and 10 W. The 2D images were collected by a planar multichannel X-ray detector. The 3D images were reconstructed by NRecon software, the porosity of sample was measured in the CTan analyser software.

Fourier Transform Infrared (FT-IR). The materials were completely mixed with KBr and crushed into a superfine powder using a mortar and a pestle. The mixture was then pressed into a KBr pellet then removed into desiccator for 24 h at a temperature of 100° C. The FT-IR spectra recorded ranged from 4000 cm$^{-1}$ to 400 cm$^{-1}$ on a FT-IR instrument (Nicolet, USA).

Raman Spectroscopy: Raman spectroscopy was performed with 532 nm laser excitation using a LabRam HR800 UV NIR (Horiba Scientific, USA). The samples were measured using the silicon substrates as the sample holder.

Limited Oxygen Index (LOI): The LOI was measured using the S/N710 oxygen index meter (Santon Redcroft Co. UK), according to the ASTM 2863 standard method. The aerogel size was controlled at 80×10×10 mm, the instrument was equipped with the top surface ignition.

Mechanical Properties Test: The compressive mechanical properties of the aerogel was investigated using a Discovery HR-2 Rheometer (TA instrument, USA). The radial and axial direction of cylindrical aerogel (17 mm of diameter) was cut from the large bulk aerogel and the compression rate was set at 1.0 N/min. The compressive Young's modulus was calculated according to the stress versus strain curve in the linear range.

Thermal Conductivity Properties and Thermographic Images: The thermal conductivity properties were measured by the Hot Disk TPS 3500 thermal constants analyzer (Hot Disk Inc., Sweden) with 10 mW output power at room temperature. The thermal conductivity was measured following ISO 22007-2:2015 method. FLIR E60 infrared thermography was used to capture the thermographic photo (FLIR Company, USA) with 0.05° C. resolution. The radial and axial direction of the samples were tested on the hot plate and the temperature range was set from 16 to 70° C.

Cone Calorimetry: Cone calorimetry (FireTEC, USA) was used to measure the combustion properties of squared aerogel (100×100×5 mm) according to the ASME E1354 standard method.

The test parameters were collected including the ignited time, peak rate and average rate of heat release, total heat released and smoke density. The test result was repeatedly measured four times to ensure the precise data.

Vertical Burning Tests (UL94): The burning performance of the aerogel was analyzed according to the UL94 standard vertical burning test. The length and diameter of the cylindrical aerogel were 120 mm and 10 mm, respectively.

Figure 6:
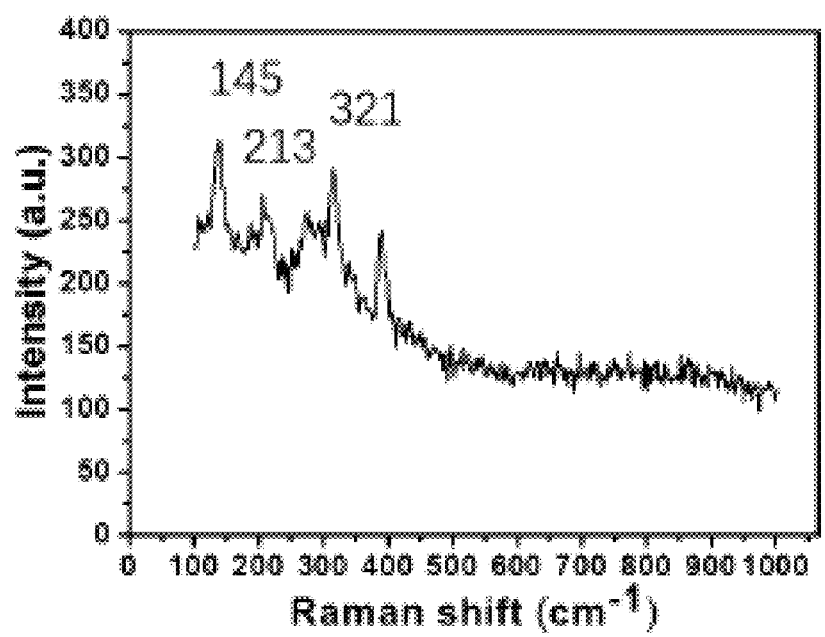
FIG. 6 shows the Raman spectrum of metallic phase $MoS_2$.

Results & Discussion
Preparation and Structural Properties of the CNF/MoS$_2$ Nanocomposite Aerogel The CNF used herein was prepared by 2,2,6,6-tetramethylpiperidine-1-oxyl radical (TEMPO) oxidation method. The obtained CNF had unique optical and mechanical properties and provided a unique, renewable building block on which materials with improved performance and new functionality could be prepared. Zhu et al. *Proceedings of the National Academy of Sciences* 2015, 112(29): 8971-76; Zhu et al. *Nanoscale* 2013, 5(9): 3787-92; Sathe et al. *Journal of Materials Science: Materials in Electronics* 2016, 27(4): 3834-3838. At the concentration of 3%, the cellulose nanofiber presented as a gel. Two dimensional MoS$_2$ nanosheets were prepared using a hydrothermal method in an autoclave, FIG. 1 image B, with molybdenum trioxide and thioacetamide as precursors and urea as the reductant. According to the Raman characterization (FIG. 6), the obtained MoS$_2$ has peaks at 145, 213, 321 cm$^{-1}$, based on which it was concluded that the obtained MoS$_2$ belong to metallic phase. Zhang et al. *Carbohydrate polymers* 2016, 136: 121-27. Meanwhile, the black color of the MoS$_2$ ink also proved the freshly prepared MoS$_2$ is metallic phase. Semiconducting MoS$_2$ presented as green color due to the band gap. The 1T phase MoS$_2$ possessed a trigonal octahedral crystalline structure, in which the atom of 'Mo' is widely exposed to the external surface. As a result, the obtained metallic phase MoS$_2$ is highly hydrophilic with contact angle ~22° and extremely stable in water for 30 days. Cellulose is hydrophilic due to the large amount hydroxyl group. In the homogenization step, the prepared CNF mixed uniformly with MoS$_2$ with no aggregation observed. Sathe reported that the Mo$^{4+}$ is presented in MoS$_2$. *Journal of Material Science: Materials in Electronics* 2016, 27(4): 3834-38. Meanwhile, attributed to the trigonal octahedral crystalline structure, abundant Mo$^{4+}$ crosslinked with the carboxyl (—COOH) and hydroxyl (—OH) group in CNF and significantly promoted the gelation of the CNF solution. In FIG. 1 image C, the CNF solution with 10.95 wt % MoS$_2$ at concentration of 5 mg/mL had the feature of high viscosity slurry.

An ultralight and freestanding aerogel (FIG. 1 image D) was fabricated from cellulose nanofibers (CNF) wrapped with MoS$_2$ 2D nanosheets by immersing the material presented in FIG. 1 image C in liquid nitrogen and followed with freezer drying. The metallic phase MoS$_2$ wrapped the CNF fiber to form a fire protection layer. Meanwhile the CNF provided the nanosheet MoS$_2$ as 3D skeleton structure, which was a dual beneficial strategy for the preparation of fire-retardant aerogel.

Figure 2:
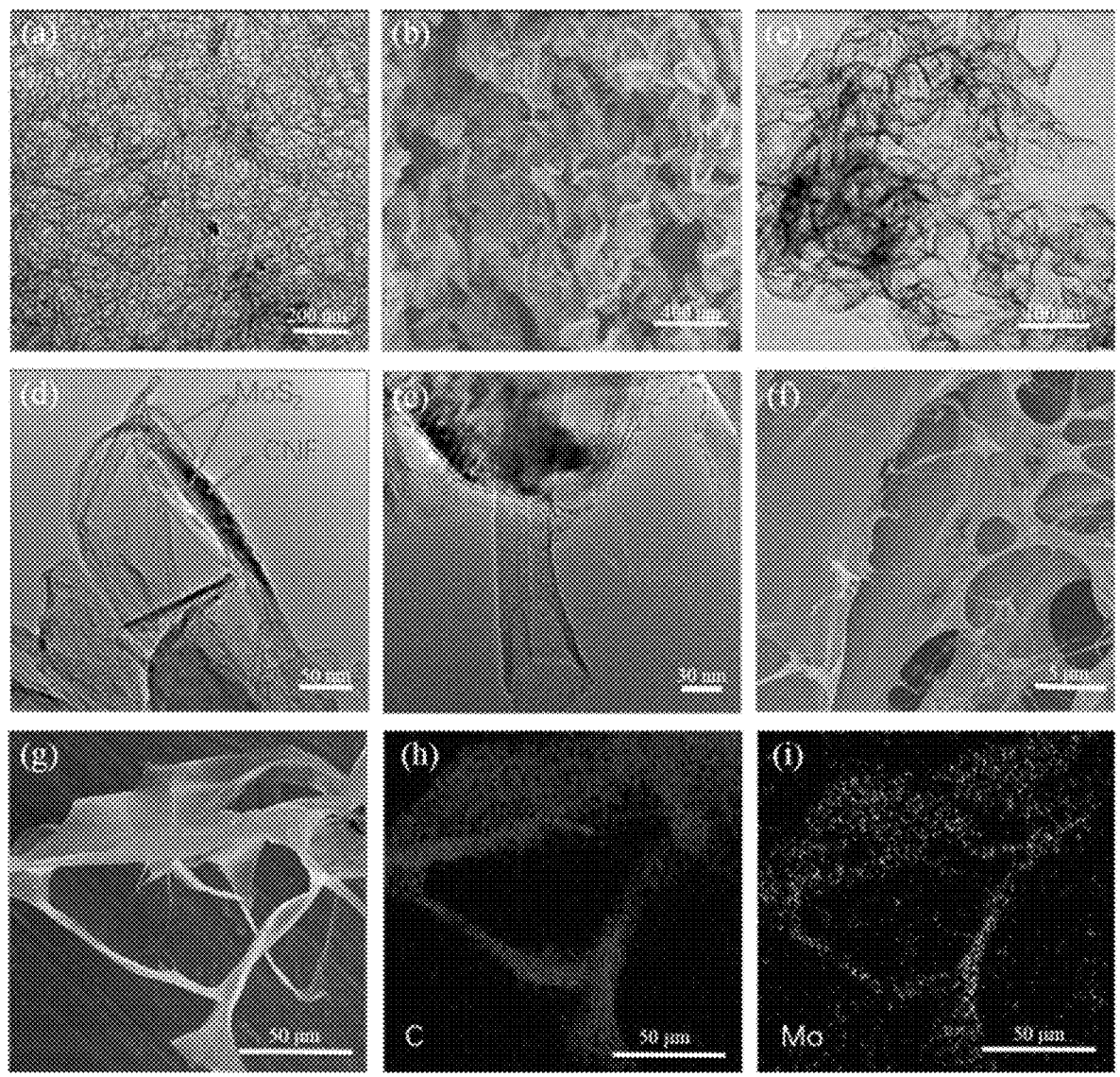
FIG. 2 is a series of images showing the morphology and structure of a CNF/$MoS_2$ nanocomposite aerogel. Image A is a TEM image of CNF showing a nanofiber structure. Image B is an SEM image showing the morphology of metallic phase $MoS_2$ exhibiting a nanolayer structure. Image C is a TEM image of metallic phase $MoS_2$ with high resolution showing single layer or several layer structure. Image D is a transition electron microscope (TEM) image of CNF/$MoS_2$ mixture in solution. Image E is a TEM image of CNF/$MoS_2$ mixture; the cross linking region is enlarged in the TEM image. Image F is scanning electron microscope (SEM) image of the CNF/$MoS_2$ aerogel with large sheet structure. Image G is an SEM image of the CNF/$MoS_2$ aerogel and the elemental mapping for carbon (Image H) and molybdenum (Image I).
Figure 7:
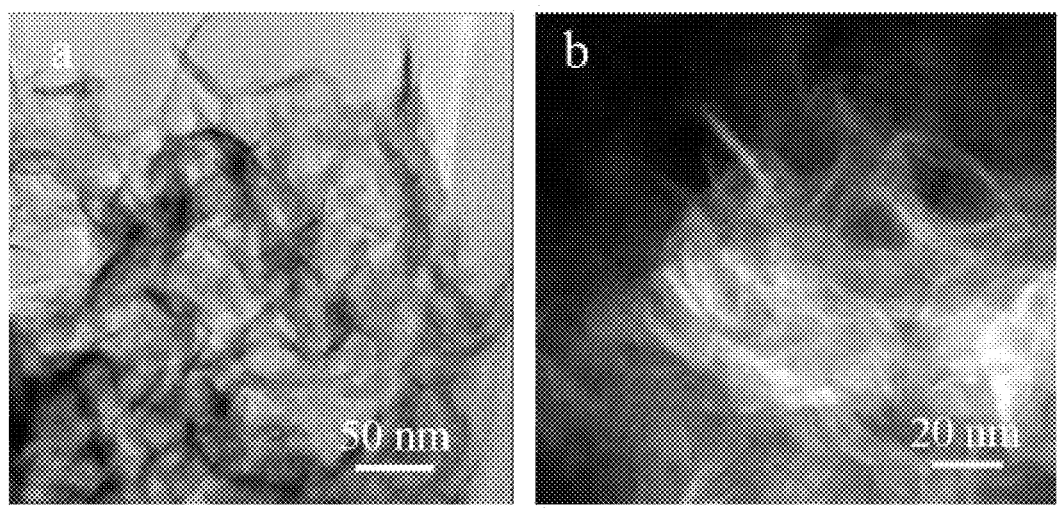
FIG. 7 is a pair of TEM images of metallic phase $MoS_2$ at different resolutions.

The transmission electron microscope (TEM) of CNF is shown in FIG. 2 image A. The CNF exhibited a uniform fibrous structure with a ~10 nm width and more than 400 nm length, which was easily dispersable in water. The C6-hydroxyl groups of the cellulose fiber surface were partially oxidized to carboxylate groups, which could be crosslinked with other polymers and metal cations. The morphology of MoS$_2$ was illustrated via scanning electron microscope (SEM) in FIG. 2 image B and TEM in FIG. 2 image C. The SEM image shows the MoS$_2$ sample exhibited a typical flaky and lamellar structure. The average planar size was determined to be about 50 nm. Additional images are shown in FIG. 7 images A and B. The metallic phase MoS$_2$ was intrinsically hydrophilic and was able to be stably dispersed in water. TEM images in FIG. 2 image C show that the MoS$_2$ nanosheet had small thickness, thereby implying that the metallic phase MoS$_2$ was dispersed into single layer or several layers in the DI water. The single-layer or several-layer structure can expose more Mo$^{4+}$ to crosslinking with —COOH and —OH groups of CNF as compared with the bulk aggregation of semiconductor phase MoS$_2$. The morphology of the CNF and MoS$_2$ composite is presented in FIG. 2 images D and E. FIG. 2 image D shows that the CNF fibers were surrounded and covered by the MoS$_2$ flakes. FIG. 2 image E shows that the layered edge of MoS$_2$ nanosheets wrapped around the CNF was clearly defined. The SEM image of the CNF/MoS$_2$ aerogel is shown in FIG. 2 image F, wherein the CNF/MoS$_2$ aerogel appeared to display an integrated and large sheet structure with an abnormally shaped pore structure on the wall. Furthermore, the energy dispersive spectroscopy (EDS) elemental mapping of "C" and "Mo" of the corresponding section in nanocomposite aerogel (FIG. 2 image G) is presented in FIG. 2 images H and I, respectively, which revealing that the CNF and $MoS_2$ were uniformly distributed in the sheet configuration of aerogel.

Microstructure Properties of the $CNF/MoS_2$ Nanocomposite Aerogel

The aerogel density was determined by weighing the samples with accurate volume. As shown in Table 1, the density of CNF aerogel was 0.00453 $g/cm^3$ and the density of $CNF/MoS_2$ was 0.00473 $g/cm^3$. Due to the addition of $MoS_2$, the apparent porosity of $CNF/MoS_2$ aerogel (97.36%) was slightly lower than a pure CNF aerogel (99.69%). The specific surfaces of the CNF and $CNF/MoS_2$ aerogel are 20.62 $m^2/g$ and 10.60 $m^2/g$ listed in Table 1, respectively, which are similar to previous reports. Dong et al. *Biomacromolecules* 2013, 14(9): 3338-45. The cumulative pore volume of CNF and $CNF/MoS_2$ aerogel were 0.038 $cm^3/g$ and 0.026 $cm^3/g$, respectively, in the range of 1.18 nm to 216.63 nm and 1.18 nm to 136.68 nm, respectively.

Figure 3:
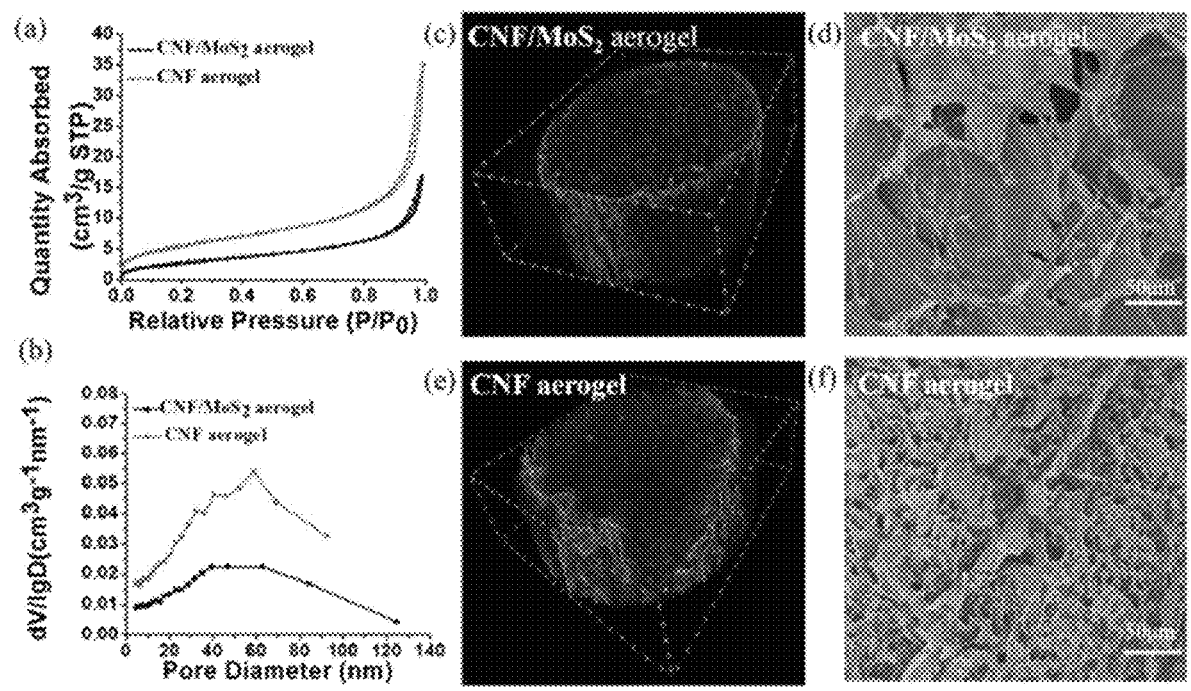
FIG. 3 is a series of images showing the microstructure properties of a CNF/$MoS_2$ nanocomposite aerogel. Image A shows the nitrogen adsorption and desorption curves of the CNF and CNF/$MoS_2$ aerogel according to the BET method. Image B shows the pore diameter distribution curve of the CNF and CNF/$MoS_2$ aerogel according to the BJH method. Image C is an X-ray microcomputed topography (μCT) image of the CNF/$MoS_2$ aerogel. Image D is a SEM image of the CNF/$MoS_2$ aerogel. Image E is an X-ray microcomputed topography (μCT) image of a CNF aerogel. Image E is an SEM image of the CNF aerogel.

The Brunauer-Emmett-Teller (BET) test was performed by a nitrogen absorption and desorption method to determine pore size distribution. The isothermal curves of the adsorption and desorption of the CNF and $CNF/MoS_2$ aerogel were presented in FIG. 3 image A. Both of the isothermal curves are belong to type IV with H3 hysteresis loop, implying that the pore distribution is irregular, the presence of micropores (0-2 nm) and mesopores (2-50 nm), and small amount of macropore region (>50 nm). The pore distribution, FIG. 3 image B, was determined using the Barrett-Joyner-Halenda (BJH) method. The pore diameter was distributed mainly at the range of 30-70 nm. The macroporous structure (<70 nm) in the aerogel could significantly decrease the gas conductivity and solid conductivity, (Hoepfner et al. *Cellulose* 2008, 15(1): 121-129), which may have improved thermal insulation performance. Since BET has limited test range of 2 nm to 125 nm, the X-ray microcomputed topography (μCT) was used to investigate the pore structure of the CNF and $CNF/MoS_2$ aerogel in the micrometer range. The reconstructed-structure of the $CNF/MoS_2$ aerogel is shown in FIG. 3 image C. The porosity of the $CNF/MoS_2$ aerogel was 80.44% in the range from 5 um to 500 um, which is significantly lower than a porosity of 97.36% in all range of pore sizes according to the Wicklein's method. The zoomed in morphology of the $CNF/MoS_2$ aerogel was shown to be disordered and formed thin layers of sheets as shown, in their corresponding SEM image FIG. 3 image D.

The $CNF/MoS_2$ aerogel contained different sized pores surrounded by ultrathin films. The controlled sample CNF aerogel structure was also reconstructed with X-ray μCT as shown in FIG. 3 image E. The porosity of CNF aerogel was 85.49%, which is indicative of the high porosity in the CNF aerogel. The SEM images of CNF aerogel was displayed cracked sheet structure and small pore in FIG. 3 image F, which is exhibit the superiority of the chemical crosslinking reaction on the preparation of aerogel. The intact sheet structure of $CNF/MoS_2$ aerogel may form an excellent fire-retardant layer to elevate the fire resistance performance.

TABLE 1

Microstructure properties of the CNF and $CNF/MoS_2$ aerogel.

| Aerogel Composition | CNF | $CNF/MoS_2$ |
|---|---|---|
| Density ($g/cm^3$) | 0.0045 | 0.0047 |
| Porosity (%) | 99.69 | 97.36 |
| Surface Area ($m^2/g$) | 20.62 | 10.60 |
| Total Pore Volume ($cm^3/g$) | 0.051 | 0.026 |

Figure 4:
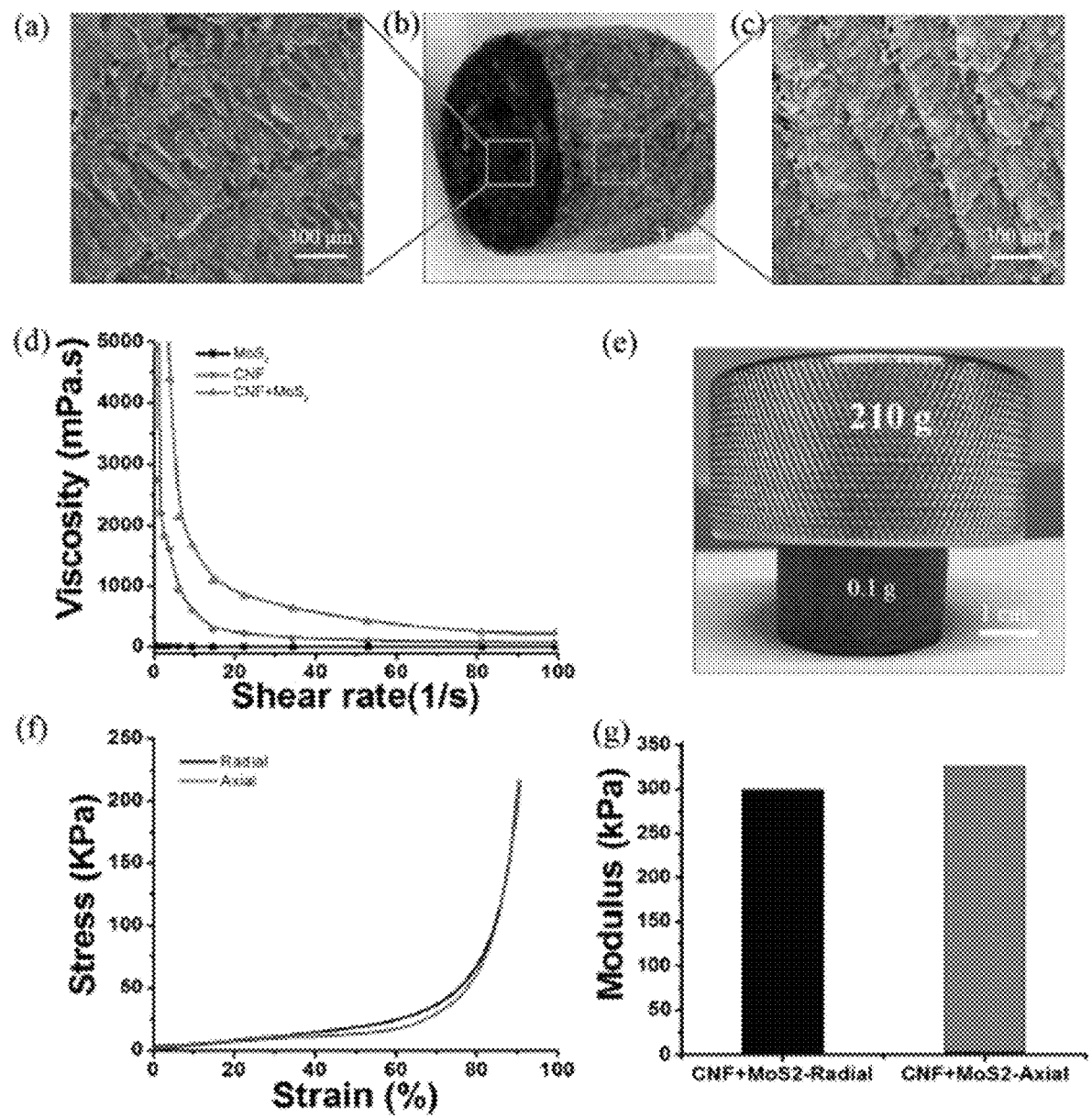
FIG. 4 is a series of images showing the morphology and mechanical strength feature of a CNF/$MoS_2$ nanocomposite aerogel. Image A is an SEM image of the CNF/$MoS_2$ aerogel in the axial direction. Image B is a photograph of the CNF/$MoS_2$ aerogel using a digital camera. Image C is an SEM image of the CNF/$MoS_2$ nanocomposite aerogel in the radial direction. Image D shows that 0.1 g of the CNF/$MoS_2$ aerogel can support a 210 g weight, more than 2100 times its own weight. Image E shows the viscosity curve of $MoS_2$, CNF, and the CNF/$MoS_2$ mixture solution. Image F is a stress versus strain curve of the CNF/$MoS_2$ aerogel in the radial and axial directions. Image G is Young's modulus E of the CNF/$MoS_2$ aerogel in the radial and axial directions.

Morphology and Mechanical Strength Features of the $CNF/MoS_2$ Nanocomposite Aerogel The morphology and porous structure of the nanocomposite aerogel in the radial and axial directions were visualized in FIG. 4 images A, B, and C. The $CNF/MoS_2$ aerogel had a sheet-like and closed porous structure with similar characteristics in the radial and axial directions. When the aqueous suspension of $CNF/MoS_2$ was totally immersed in the liquid nitrogen, the ice crystals were grown haphazardly in different direction. The viscosity of the $MoS_2$, CNF, and $CNF/MoS_2$ solution at concentration of 5 mg/mL were measured, see FIG. 4 image D. The viscosity of $CNF/MoS_2$ mixture (227.21 mPa·s) was more than three-fold higher than the CNF solution (70.21 mPa·s). The viscosity of the $MoS_2$ solution was only 2.88 mPa·s, which is similar to the viscosity of DI water. Dong et al reported that the transition metal cation such as Fe $Cu^{3+}$, and $Zn^{2+}$ can effectively crosslink with the carboxyl group in CNF, (*Biomacromolecules* 2013, 14(9):3338-45) which could compose a three-dimensional polymer network structure. Hoepfner reported that it was difficult to create a stable aerogel at low CNF concentrations less than 20 mg/mL. *Cellulose* 2008. The high viscosity of the $CNF/MoS_2$ mixture after crosslinking may have provided a benefit to the aerogel formation. Note that with the same concentration 5 mg/mL of CNF suspension before mixing with $MoS_2$, it was impossible to fabricate a stable aerogel.

The freestanding properties of $CNF/MoS_2$ aerogel were visualized in FIG. 4 image E, which showed that 0.1 g of the $CNF/MoS_2$ nanocomposite aerogel was able to support a 210 g weight, more than 2100 times its own weight. The mechanical properties of $CNF/MoS_2$ aerogel were investigated in both the radial and axial directions by a compression test. This isotropic, sheet-like, and porous structure afford the excellent mechanical strength of nanocomposite both in radial and axial direction. The compression stress-strain curve is shown in FIG. 4 images F and G. Under a strain of 60%, the stress increased slowly, but when the strain reached 60%, the stress increased dramatically simultaneously in the radial and axial directions. The fire retardant aerogel could be compressed to a large strain range (60%) both in the radial and axial directions at relatively low stress (17.70 KPa at radial direction and 24.98 KPa at axial direction), indicating the nanocomposite aerogel has excellent elasticity. When the strain reached 90%, the compression stress of the $CNF/MoS_2$ aerogel was increased to 216.64 KPa in the radial direction and 215.85 KPa in the axial directions. This result was significantly higher than previous reports of 25.3 KPa for CNF aerogel. Wang et al. *Cellulose* 2015, 22(6): 3799-3810. Young's modulus of 299.23 KPa at the radial and 326.48 KPa at axial directions were achieved, FIG. 4 image G. The mechanical properties of $CNF/MoS_2$ aerogel was significantly increased compared to other CNF aerogels prepared at the same CNF concentration, which may indicate that the Mo atom from 2D nanolayered $MoS_2$ was nano-linked with the carboxyl groups (—COOH) and hydroxyl groups (—OH) from CNF. The mechanical properties of $CNF/MoS_2$ aerogel showed no obvious difference in the radial and axial directions, which was correlated with the disorderly sheet-like and porous structure.

Limited Oxygen Index and Thermal Conductivity Properties of the CNF/MoS$_2$ Nanocomposite Aerogel Limiting oxygen index (LOI) as a minimum oxygen concentration in the oxygen/nitrogen mixture gas to support the material burning was the principal parameter for the fire retardant materials. The higher LOI means the better the fire resistance capability. Zhao et al. *Cellulose* 2014, 21(3): 1859-72. Herein, the LOI was determined by the ASTM 2863 standard method test with S/N710 oxygen index meter equipment, as described above. The LOI of CNF/MoS$_2$ nanocomposite aerogel was 34.7%, which is twice that of the pure cellulose (19%). Jonoobi et al. *Cellulose* 2015, 22(2): 935-969. The LOI of CNF/MoS$_2$ nanocomposite aerogel was also found to be higher than other cellulosic fire retardant, such as cellulose/montmorillonites nanocomposite (29.3%) and cellulose/magnesium hydroxide nanocomposite film (20%). Zhao et al. *Cellulose* 2014, 21(3): 1859-1872; Notario et al. *Polymer* 2015, 56: 57-67. Wicklein reported that the LOI of nanocellulose/graphene oxide/magnesiosilicate/boric acid foams was 34%, which was similar to the present results. *Nature nanotechnology* 2015, 10(3): 277-283.

The thermal conductivity coefficient of the CNF/MoS$_2$ nanocomposite aerogel was measured using a hot disk TPS 3500 instrument (Hot Disk AB, Sweden) at 22° C. The thermal conductivity of the CNF/MoS$_2$ aerogel is 28.09 mWm$^{-1}$K$^{-1}$, close to the thermal conductivity of air (26.2 mWm$^{-1}$K$^{-1}$) at ambient temperature. The thermal transmission of the aerogel was may be caused by three factors: the heat conduction, the heat convection, and heat radiation. The pores size of CNF/MoS$_2$ aerogel (30-70 nm) was found to be smaller than the mean free path of gas (70 nm), which significantly decreased the gas heat conductivity due to the Knudsen effect. Notario et al. *Polymer* 2015, 56: 57-67. On the other hand, the relativity small density (0.0047 g/cm$^3$) and the macroporous structure in the aerogel could significantly decrease the solid conductivity. Jimenez-Saelices *Carbohydrate Polymers* 2017. The thermographicimages captured with an infrared camera in axial and radial revealed that the CNF/MoS$_2$ nanocomposite aerogel has perfect thermal insulation in the both directions. The temperature profile of the aerogel was modeled with COMSOL Multiphysics using the heat conduction equation given by Equation (2):

$$\rho c_p \frac{\delta T}{\delta t} \pi r^2 + \overline{V} \cdot (k\overline{V}T) = 0 \quad (2)$$

Where ρ is the density of the aerogel; $c_p$ is the specific heat at constant pressure; the thermal conductivity k is measured from thermal conductivity experiment; t is time; T is the temperature of aerogel. With boundary condition at the boundary that face the air given by Equation (3):

$$k\left(\frac{\delta T}{\delta n}\right) = h(T - T_{ext}) \quad (3)$$

Where n is the normal unit vector to the boundaries. The boundary temperature is T=70° C. at the boundary between the aerogel and the hot plate. The natural convection heat transfer coefficient h is estimated at 0.5 W/(m$^2$·K) and $T_{ext}$ is 20° C. for the external ambient temperature. The simulation further revealed that our materials has superior thermal insulating capability.

Combustion Behavior of the CNF/MoS$_2$ Nanocomposite Aerogel

The combustion behavior of the CNF/MoS$_2$ nanocomposite aerogel was investigated using a vertical burning test. The result displayed excellent fire retardant and self-extinguishing properties. The polymer combustion included three procedures: polymer melting, pyrolysis and volatile product combustion. Morgan et al. *Fire and Materials* 2013, 37(4): 259-279. The melting point of MoS$_2$ is 1185° C., was represents excellent thermal stability at high temperature. Anderson et al. *Journal of Materials Chemistry* 2010, 20(12): 2400-2407.

When the CNF was surrounded by the MoS$_2$ nanosheet, an excellent physical barrier was formed to prevent the CNF burning. Zhou reported that MoS$_2$ as a "char reinforce" could remarkably promote the polymer carbonization to keep the char layer intact, which further improved the polymer thermal insulating and flame retardant properties. *RSC Advances* 2016, 6(44): 37672-80. However, the CNF/MoS$_2$ aerogel prepared by dipping the CNF aerogel in the MoS$_2$ ink burned expeditiously and the 3D framework almost collapsed to powder residue after burning. In this facial dipping process, it was expected that the MoS$_2$ nanosheet would simply cover the surface of the whole aerogel instead of perfectly wrapping the individually cellulose nanofibers and forming a barrier protection layer. Herein, the MoS$_2$ nanosheets were homogenized with cellulose nanofibers for 30 min sonication and 1 h stirring and left the mixture standing for crosslinking. The MoS$_2$ nanosheets wrapped well with the cellulose nanofiber during this process, which significantly improved the fire resistant capability compared to the count part dipping method.

The combustion behavior of CNF/MoS$_2$ aerogel was further investigated by oxygen consumption cone calorimetry. The CNF/MoS$_2$ aerogel was exposed to a 25 kW/m$^2$ heat flux according to the ASTM E 1354 method. The CNF/MoS$_2$ aerogel hardly ignited and no visible flame and smoke appeared under the totally test process. The result of the peak heat release rate (pkHRR) was 31 kW/m$^2$ as shown in Table 2. The pkHRR displays a significant reduce than the carboxymethyl cellulose sodium (CMC) paper (94.4 kW/m$^2$). *Anderson Journal Materials Chemistry* 2010. The pkHRR of CNF/MoS$_2$ aerogel was found to be 67.2%, which was also lower than CMC paper. The total heat release of CNF/MoS$_2$ aerogel was 0.4 MJ/m$^2$, which was also significantly smaller than the CMC paper (1.53 MJ/m$^2$). Id. Note that the sodium in the CMC can significantly improve the fire resistant properties in cellulosic material. Pure CNF aerogel has higher peak of heat release rates as 60 kW/m$^2$. Wicklein *Nature Nanotechnology* 2015. Those results demonstrated that the addition of MoS$_2$ could remarkably suppress the combustion of the cellulosic materials. After the cone calorimetry test, the CNF/MoS$_2$ aerogel was deformed due to shrinking, but combustion residue was retained, Table 2, from which it was expected that the external portion of CNF was carbonized to residual char and formed as a protective barrier to protect the interior layer of residual CNF.

TABLE 2

Result of cone calorimeter for CNF/MoS$_2$ aerogel.

| Sample | Heating flux (kW/m$^2$) | Initial mass (g) | Final mass (g) | pkHRR (kW/m$^2$) | THR (MJ/m$^2$) |
|---|---|---|---|---|---|
| CNF/MoS$_2$ aerogel | 25 | 0.39 | 0.32 | 31 | 0.4 |
| CMC paper | 25 | 1.14 | / | 94.4 | 1.53 |

Microstructural and Decomposition Properties of the CNF/MoS$_2$ Nanocomposite Aerogel After Burning The morphology and structure of the aerogel after burning was further investigated. There was obvious crinkle from the sheet structure to the fascicular structure after combustion (FIG. 5 image B), while the micro morphology structure of the CNF/MoS$_2$ aerogel was no significant difference in radial and axial directions after burning, FIG. 5 images A and B. The morphology of CNF/MoS$_2$ aerogel after combustion shows smooth surface with intact carbon sheet (red arrow) in FIG. 5 image D. Feng reported that the addition of MoS$_2$ can remarkably improve carbonization of polymer to intact char layer. *Journal of Materials Chemistry A* 2014, 2(33):13299-308. From result of Raman spectra of after burning, two peaks were respectively appeared at 1358 cm$^{-1}$ (D band) and 1586 cm$^{-1}$ (G band), which may be indicative of CNF being carbonized to thermal stable char layer after burning in FIG. 5 image E. The formation of intact protective char layer as the second physical barriers could further elevate thermal stability and fire retardant properties. Id.

Figure 5:
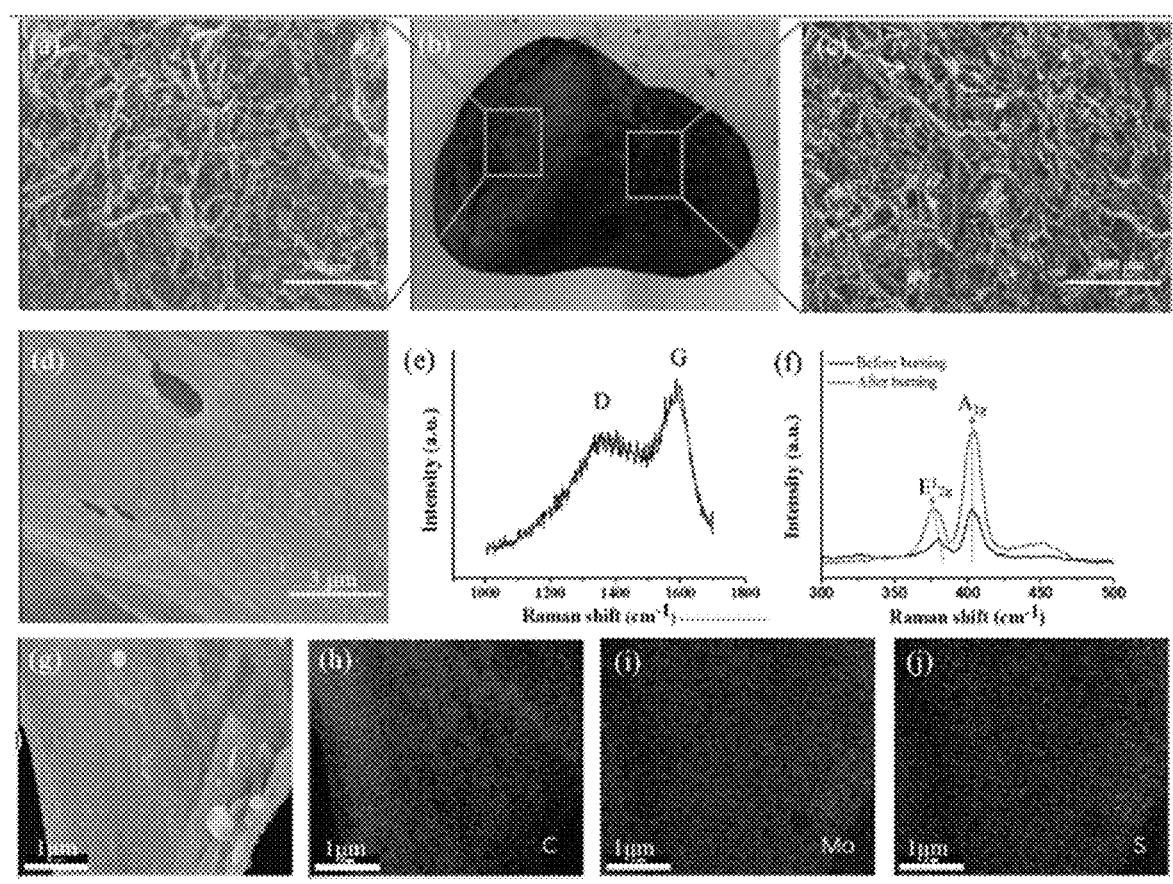
FIG. 5 is a series of images showing the morphology and structure of a CNF/$MoS_2$ nanocomposite aerogel after burning. Image A shows an SEM image of the CNF/$MoS_2$ aerogel after burning in the axial direction. Image B is a photograph of the CNF/$MoS_2$ aerogel after burning using a digital camera. Image C is an SEM image of the CNF/$MoS_2$ aerogel after burning in the radial direction. Image D is an SEM image of the CNF/$MoS_2$ aerogel with the smooth surface after burning, and showing the intact chair layer (arrow). Image E is a Raman spectrum of the CNF/$MoS_2$ aerogel after burning, indicating the formation of intact char layer from CNF. Image F is an overlay of Raman spectra of the aerogel before burning and after burning. Image G SEM image of the CNF/$MoS_2$ aerogel after burning and elemental mapping for carbon (Image H), molybdenum (Image I) and sulfur (Image J).

The Raman spectra of MoS$_2$ in CNF/MoS$_2$ aerogel before and after burning are presented in FIG. 5 image F. Based on the two characteristic peaks presented at ~378 nm and ~403 nm from MoS$_2$ after burning, it may be concluded that the MoS$_2$ was intact after burning, the two characteristic modes of $E^1_{2g}$ and $A_{1g}$ (378 cm$^{-1}$ and 403 cm$^{-1}$) appeared in CNF/MoS$_2$ aerogel before burning indicates initial metallic phase MoS$_2$ transferred to semiconducting phase during freeze drying process under vacuum. The peak position of $E^1_{2g}$ and $Ai_{1g}$ of CNF/MoS$_2$ aerogel were closer than pure semiconducting phase MoS$_2$, which may suggest that the thickness of the MoS$_2$ layer was decreased; without being bound by any one particular theory, this may be because CNF contributed to the dispersion of the MoS$_2$. Li 2015. After burning, the characteristic peak of $_{E12g}$ appeared at 376 cm$^{-1}$, and the characteristic peak of $_{A1g}$ appeared at 403 cm$^{-1}$. The peak distance between $E^1_{2g}$ and $A_{1g}$ of MoS$_2$ in the CNF/MoS$_2$ aerogel after burning was bigger than semiconducting phase MoS$_2$ before burning, which indicate the MoS$_2$ is thicker. The phenomenon is consistent with the SEM image, which may indicate the crinkles after the combustion of the CNF/MoS$_2$ aerogel in FIG. 5 images A and C. Furthermore, the elemental mapping of the CNF/MoS$_2$ aerogel after burning was investigated in FIG. 5 images G-J. The energy dispersive spectroscopy (EDS) elemental mapping of carbon, molybdenum, and sulfur of the corresponding section in combustion residues (FIG. 5 image G) is presented in FIG. 5 images H, I, and J, individually. From the elemental mapping of carbon represented the CNF and chair, and molybdenum and sulfur represented "MoS$_2$", which suggests that MoS$_2$ was not burned and degraded in combustion residues of CNF/MoS$_2$ aerogel after 30 s burning.

In summary, 2D metallic MoS$_2$ nanosheets were used to wrap cellulose nanofiber. Due to the present of "Mo$^{4+}$" in the MoS$_2$, a hydrogel with large viscosity was obtained for the aerogel preparation via crosslinking. The 2D MoS$_2$ nanosheets uniformly wrapped on the surface of cellulose nanofiber, forming and form a fire resistant barrier layer. The obtained aerogel was lightweight and strong. Additionally, the obtained aerogel has limited oxygen index (34.7%), thermal conductivity (28.09 mWm$^{-1}$K$^{-1}$), and excellent combustion behavior. Furthermore, the MoS$_2$ stayed intact after burning.

INCORPORATION BY REFERENCE

All patents and published patent applications mentioned in the description above are incorporated by reference herein in their entirety.

EQUIVALENTS

Having now fully described the present invention in some detail by way of illustration and example for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

We claim:

1. An aerogel comprising a plurality of layers, wherein the plurality of layers includes at least one inner layer and an outer layer; each inner layer forms a core that structurally supports the outer layer; at least one inner layer comprises cellulose nanofibers; the outer layer comprises metallic molybdenum disulfide (MoS$_2$); and all of the layers are bonded together to form a single, substantially fire resistant structure.

2. The aerogel of claim 1, having a density from about 0.003 g/cm$^3$ to 0.006 g/cm$^3$.

3. The aerogel of claim 1, having a porosity from about 95% to about 99%.

4. The aerogel of claim 1, having a thermal conductivity from about 26 mW/m·K to about 29 mW/m·K.

5. The aerogel of claim 1, wherein the cellulose nanofibers are oxidized cellulose nanofibers.

6. The aerogel of claim 5, wherein the cellulose nanofibers form a two dimensional nanostructure.

7. The aerogel of claim 6, wherein the two dimensional nanostructure is a nanosheet.

8. The aerogel of claim 1, wherein the cellulose nanofibers are softwood cellulose nanofibers.

9. The aerogel of claim 1, wherein the metallic MoS$_2$ and the cellulose nanofibers are crosslinked to form metal-carboxylate complexes.

10. A method of preparing the aerogel of claim 1, comprising freeze-drying a mixture of cellulose nanofibers and MoS$_2$.

11. The method of claim 10, wherein the cellulose nanofibers are oxidized cellulose nanofibers.

12. The method of claim 11, wherein the oxidized cellulose nanofibers are prepared by oxoammonium-catalyzed oxidation of softwood pulp.

13. The method of claim 12, wherein the oxoammonium-catalyzed oxidation comprises reacting softwood pulp and an oxidizing agent.

14. The method of claim 13, wherein the oxidizing agent is sodium hypochlorite, 2,2,6,6-tetramethylpiperidine-1-oxyl (TEMPO) or a derivative thereof, potassium permanganate, chromium trioxide, pyridinium chlorochromate in dimethylformamide, ruthenium tetroxide, or platinium in an oxygen atmosphere.

15. The method of claim 10, further comprising immersing the mixture of cellulose nanofibers and $MoS_2$ in a cryogenic fluid prior to freeze-drying the mixture.

16. The method of claim 10, further comprising cross-linking the metallic $MoS_2$ and the cellulose nanofibers.

17. The method of claim 10, further comprising suspending the mixture of cellulose nanofibers and metallic $MoS_2$ in deionized water prior to immersing the mixture in the cryogenic fluid.

18. A method of fire protection, comprising providing a fire zone with the aerogel of claim 1.

19. The method of claim 18, wherein the fire zone is in a vehicle or a construction zone.

\* \* \* \* \*